(12) United States Patent
Lai et al.

(10) Patent No.: US 8,303,040 B2
(45) Date of Patent: Nov. 6, 2012

(54) PILLOW SUPPORT STRUCTURE OF A CHAIR

(76) Inventors: Yu-Shan Lai, Chiayi (TW); Yen-Chuan Lai, Chiayi (TW)

( * ) Notice: Subject to any disclaimer, the term of this patent is extended or adjusted under 35 U.S.C. 154(b) by 130 days.

(21) Appl. No.: 13/023,077

(22) Filed: Feb. 8, 2011

(65) Prior Publication Data

US 2012/0200134 A1 Aug. 9, 2012

(51) Int. Cl.
*A47C 1/10* (2006.01)
*A47C 7/38* (2006.01)

(52) U.S. Cl. ........................................ 297/410; 297/353

(58) Field of Classification Search ............... 297/64, 297/353, 410

See application file for complete search history.

(56) References Cited

U.S. PATENT DOCUMENTS

| | | | | |
|---|---|---|---|---|
| 2,985,229 A | * | 5/1961 | Shamblin | 297/410 |
| 3,877,751 A | * | 4/1975 | Rasmussen | 297/410 |
| 5,435,626 A | * | 7/1995 | Lai | 297/411.36 |
| 5,931,537 A | * | 8/1999 | Gollin et al. | 297/411.36 |
| 6,419,323 B1 | * | 7/2002 | Chu et al. | 297/411.36 |
| 6,974,190 B1 | * | 12/2005 | Hung | 297/411.36 |
| 7,055,909 B2 | | 6/2006 | Wu | |
| 7,452,031 B2 | * | 11/2008 | Woellert et al. | 297/250.1 |
| 7,690,729 B2 | * | 4/2010 | Liao | 297/408 |
| 7,806,481 B2 | * | 10/2010 | Eberlein | 297/411.37 |
| 2004/0189068 A1 | * | 9/2004 | Meeker et al. | 297/250.1 |

* cited by examiner

*Primary Examiner* — David Dunn
*Assistant Examiner* — Richard Lowry
(74) *Attorney, Agent, or Firm* — Alan Kamrath; Kamrath IP Lawfirm, PA

(57) ABSTRACT

A pillow support structure of a chair contains a fixing unit including a body and a back cover, wherein the body includes a longitudinal groove having a laterally through slot and a limiting piece with a tilted guide recess and a defining end; the longitudinal groove includes a resilient swinging rib with a tooth portion and an abutting tab; a vertical moving unit including a moving member and a sliding panel having a stop element, a plurality of peripheral teeth, and includes a side rim biased against the abutting tab; an inserting member including a biasing end and a pressing segment, such that the stop element of the sliding panel of the moving member is capable of preventing from contacting with the defining end of the body so that the sliding panel of the moving member disengages from the body smoothly.

5 Claims, 5 Drawing Sheets

PILLOW SUPPORT STRUCTURE OF A CHAIR

BACKGROUND OF THE INVENTION

1. Field of the Invention

The present invention relates to a pillow support structure of a chair that is capable of adjusting the pillow's height based on requirement and removing a pillow support quickly to be maintained easily.

2. Description of the Prior Art

A conventional pillow support structure is fixed on a chair to comfort a user when he/she lies backward on a chair back of the chair.

A structure of a chair pillow disclosed in U.S. Pat. No. 7,055,909 is used on a chair and contains the chair pillow including a pivoting portion to axially connected with one end of a first connecting unit, a second connecting unit disposed on another end of the first connecting unit, a fixing device coupled with one end of the second connecting unit to generate a limiting angle, the second connecting unit including a fitting segment formed on another end thereof to connect with an upper end of the chair back of the chair; thereby the pivoting portion of the chair pillow, the first connecting unit, and the second connecting unit are capable of being used to adjust the chair pillow so that the user adjusts a desired height and angle to comfort his/her head.

However, such a structure of the chair pillow still has the following disadvantage:

The chair pillow can not be removed from the chair easily, thus maintaining the chair pillow difficultly.

The present invention has arisen to mitigate and/or obviate the afore-described disadvantages.

SUMMARY OF THE INVENTION

The primary object of the present invention is to provide a pillow support structure of a chair that is capable of adjusting the pillow's height based on requirement and removing a pillow support quickly to be maintained easily.

To obtain the above objective, a pillow support structure of a chair provided by the present invention contains:

a fixing unit including a body and a back cover, wherein the body includes a longitudinal groove fixed therein, the longitudinal groove includes a laterally through slot secured adjacent to a top end thereof and having a limiting piece to swing resiliently connected with the through slot, and the limiting piece includes a tilted guide recess disposed on a top end thereof and a defining end formed on a bottom end thereof; the longitudinal groove includes a resilient swinging rib and an abutting tab fixed on two preset positions of two sides thereof individually, wherein the swinging rib includes a tooth portion;

a vertical moving unit including a moving member and a sliding panel coupled on a bottom end of the moving member, wherein the sliding panel is fixed in the longitudinal groove of the body and includes a stop element secured on a predetermined position thereof to be limited on a defining end of the body, wherein the sliding panel includes a plurality of peripheral teeth arranged on one side thereof and includes a side rim attached on another side thereof so that the peripheral teeth engage with the tooth portion of the body to obtain a multi-section positioning purpose, and the side rim is biased against the abutting tab of the body;

an inserting member including a biasing end disposed on a bottom end thereof and a pressing segment fixed on a top end thereof so that the inserting member is inserted into the tilted guide recess of the body, hence the pressing segment is pressed so that the limiting piece of the body is forced to swing the defining end outward by ways of the tilted guide recess, such that the stop element of the sliding panel of the moving member is capable of preventing from contacting with the defining end of the body so that the sliding panel of the moving member disengages from the body smoothly.

Thereby, the vertical moving unit of the pillow support is capable of being adjusted to move upward and downward relative to the fixing unit of the supporting plate in a multi-section adjusting manner, and the vertical moving unit of the pillow support is removed from the fixing unit quickly to be maintained easily.

DETAILED DESCRIPTION OF THE PREFERRED EMBODIMENTS

Figure 1:
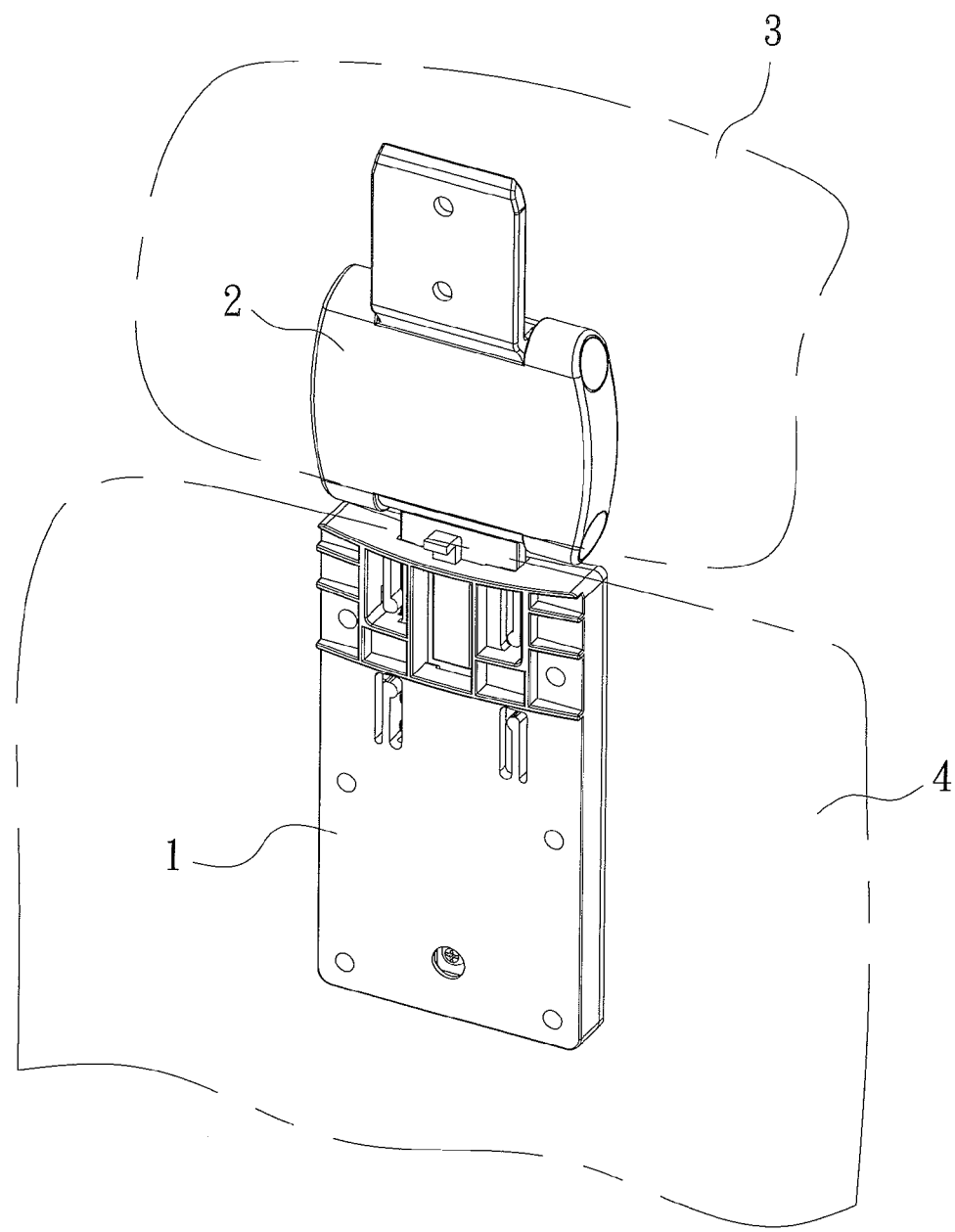
FIG. 1 is a perspective view showing the assembly of a fixing unit and a vertical moving unit of a pillow support structure of a chair according to a preferred embodiment of the present invention.
Figure 2:
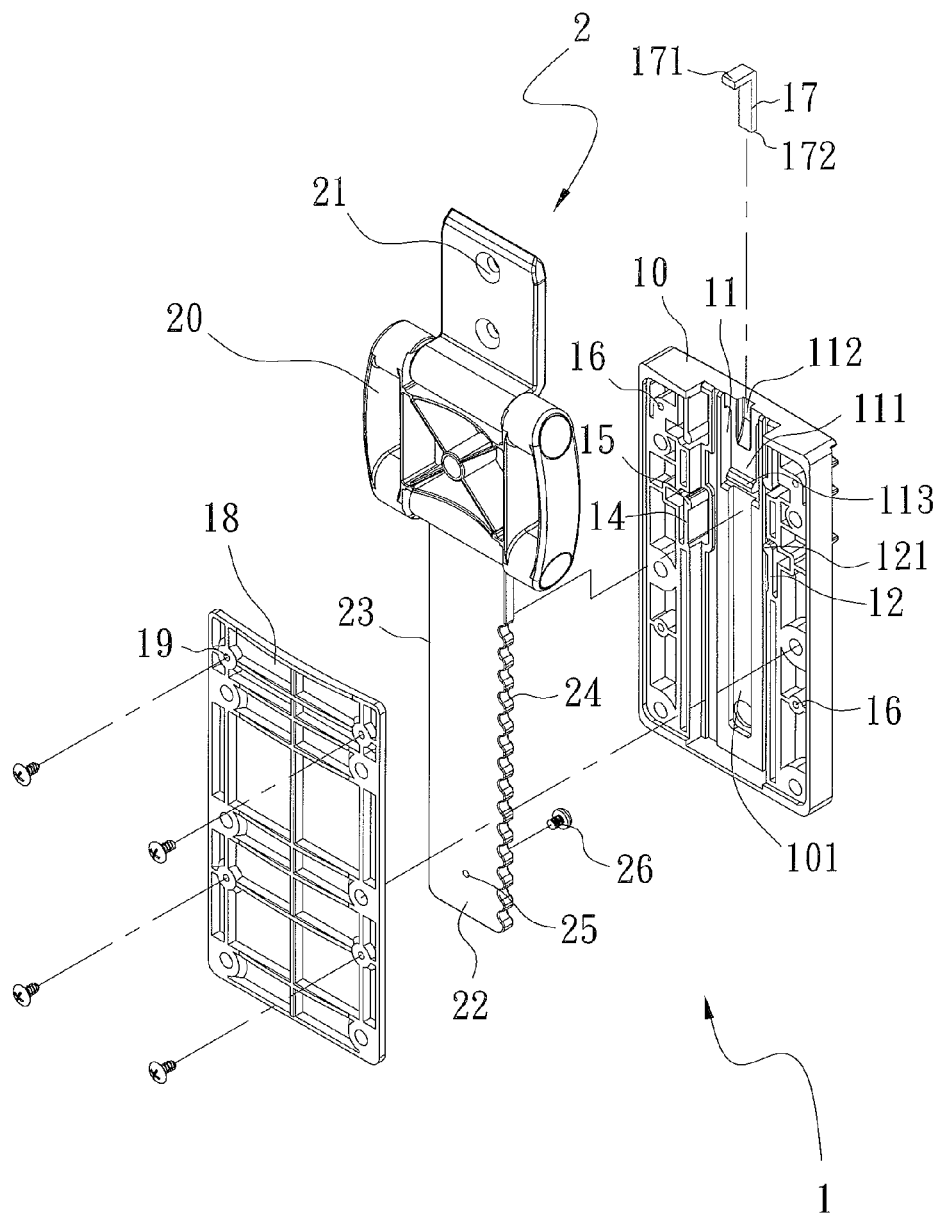
FIG. 2 is a perspective view showing the exploded components of the fixing unit and the vertical moving unit of the pillow support structure of the chair according to the preferred embodiment of the present invention.

The present invention will be clearer from the following description when viewed together with the accompanying drawings, which show, for purpose of illustrations only, the preferred embodiment in accordance with the present invention.

With reference to FIGS. 1-5, a pillow support structure of a chair according to a preferred embodiment of the present invention comprises:

a fixing unit 1 including a body 10 and a back cover 18, wherein the body 10 includes a plurality of holes 16 disposed at predetermined positions of an inner side thereof, and each hole 16 includes inner threads formed therein, the back cover 18 includes a number of orifices 19 arranged thereon to correspond to the holes 16 of the body 10 respectively so that the back cover 18 and the body 10 are connected together by screwing a plurality of preset bolt elements with the holes 16 and the orifices 19 individually, and the body 10 of the fixing unit 1 further includes a supporting plate 4 to cover the chair and a longitudinal groove 101 fixed therein, the longitudinal groove 101 includes a laterally through slot 11 secured adjacent to a top end thereof and having a limiting piece 111 to swing resiliently connected with the through slot 11, and the limiting piece 111 includes a tilted guide recess 112 disposed on a top end thereof and a defining end 113 formed on a bottom end thereof; the longitudinal groove 101 includes a resilient swinging rib 12 and an abutting tab 14 fixed on two preset positions of two sides thereof individually, wherein the swinging rib 12 includes a tooth portion 121, and the abutting tab 14 includes a contacting portion 15;

a vertical moving unit 2 including a moving member 20, a sliding panel 22 coupled on a bottom end of the moving member 20, and a positioning portion 21 formed on a top end of the moving member 20, the moving member 20 further including a pillow support 3 to cover the chair fixed on the positioning portion 21 of the moving member 20 by using the preset bolt elements, wherein the sliding panel 22 is fixed in the longitudinal groove 101 of the body 10 and includes a stop element 26 secured on a predetermined position thereof to be limited on a defining end 113 of the body 10, wherein the stop element 26 of the sliding panel 22 is formed in a bolt shape and includes outer threads formed thereon, the sliding panel 22 includes a screw aperture 25 to correspond to the stop element 26 so that the stop element 26 is screwed with the screw aperture 25 of the sliding panel 22 and includes a plurality of peripheral teeth 24 arranged on one side thereof and includes a side rim 23 attached on another side thereof so that the peripheral teeth 24 engage with the tooth portion 121 of the body 10 to obtain a multi-section positioning purpose, and the side rim 23 is biased against the contacting portion 15 of the body 10;

an inserting member 17 including a biasing end 172 disposed on a bottom end thereof and a pressing segment 171 fixed on a top end thereof so that the inserting member 17 is inserted into the tilted guide recess 112 of the body 10, hence the pressing segment 171 is pressed so that the limiting piece 111 of the body 10 is forced to swing the defining end 113 outward by ways of the tilted guide recess 112, such that the stop element 26 of the sliding panel 22 of the moving member 20 is capable of preventing from contacting with the defining end 113 of the body 10 so that the sliding panel 22 of the moving member 20 disengages from the body 10 smoothly.

Figure 3:
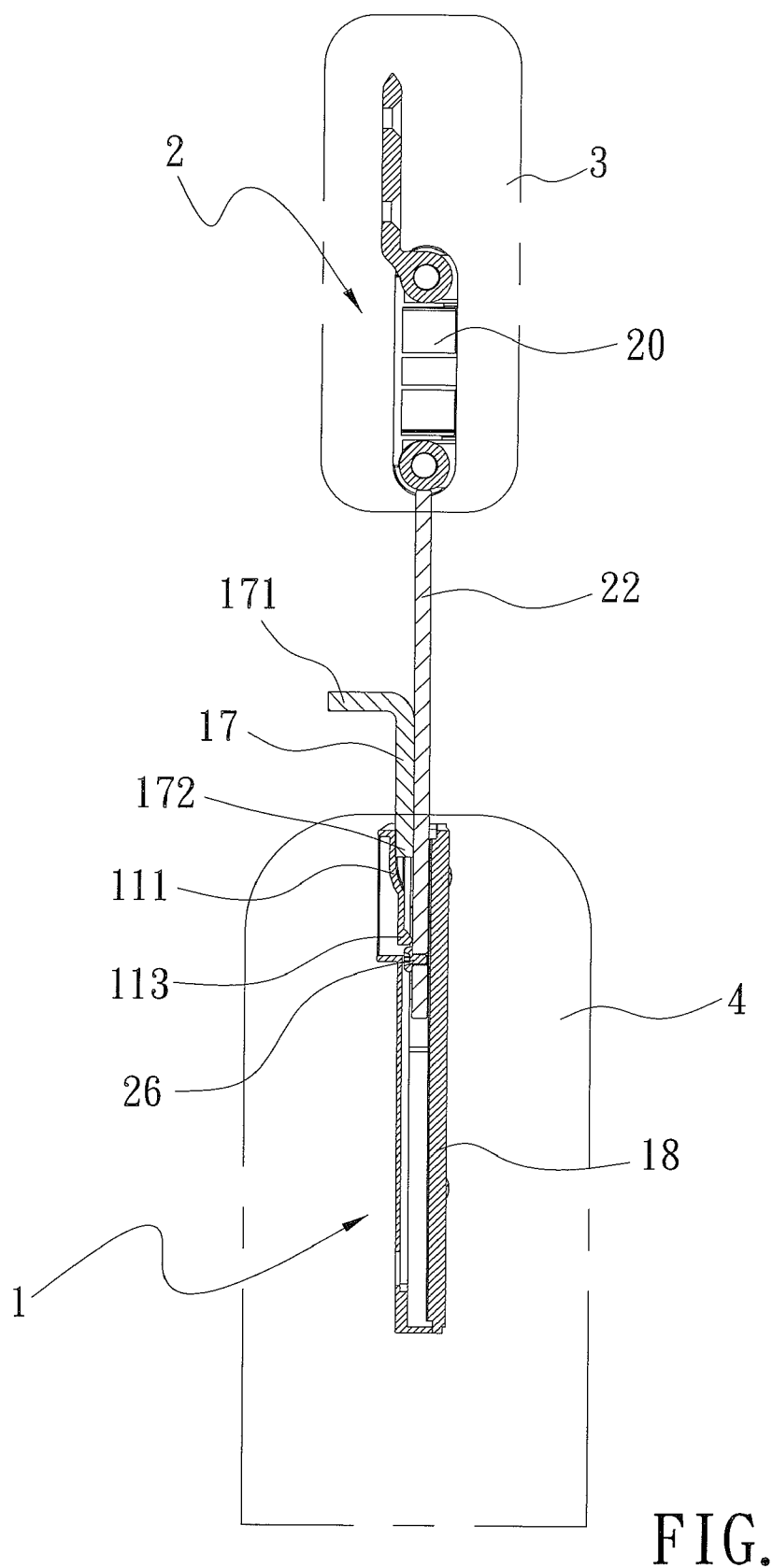
FIG. 3 is a cross sectional view showing the assembly of the fixing unit and the vertical moving unit of the pillow support structure of the chair according to the preferred embodiment of the present invention.
Figure 4:
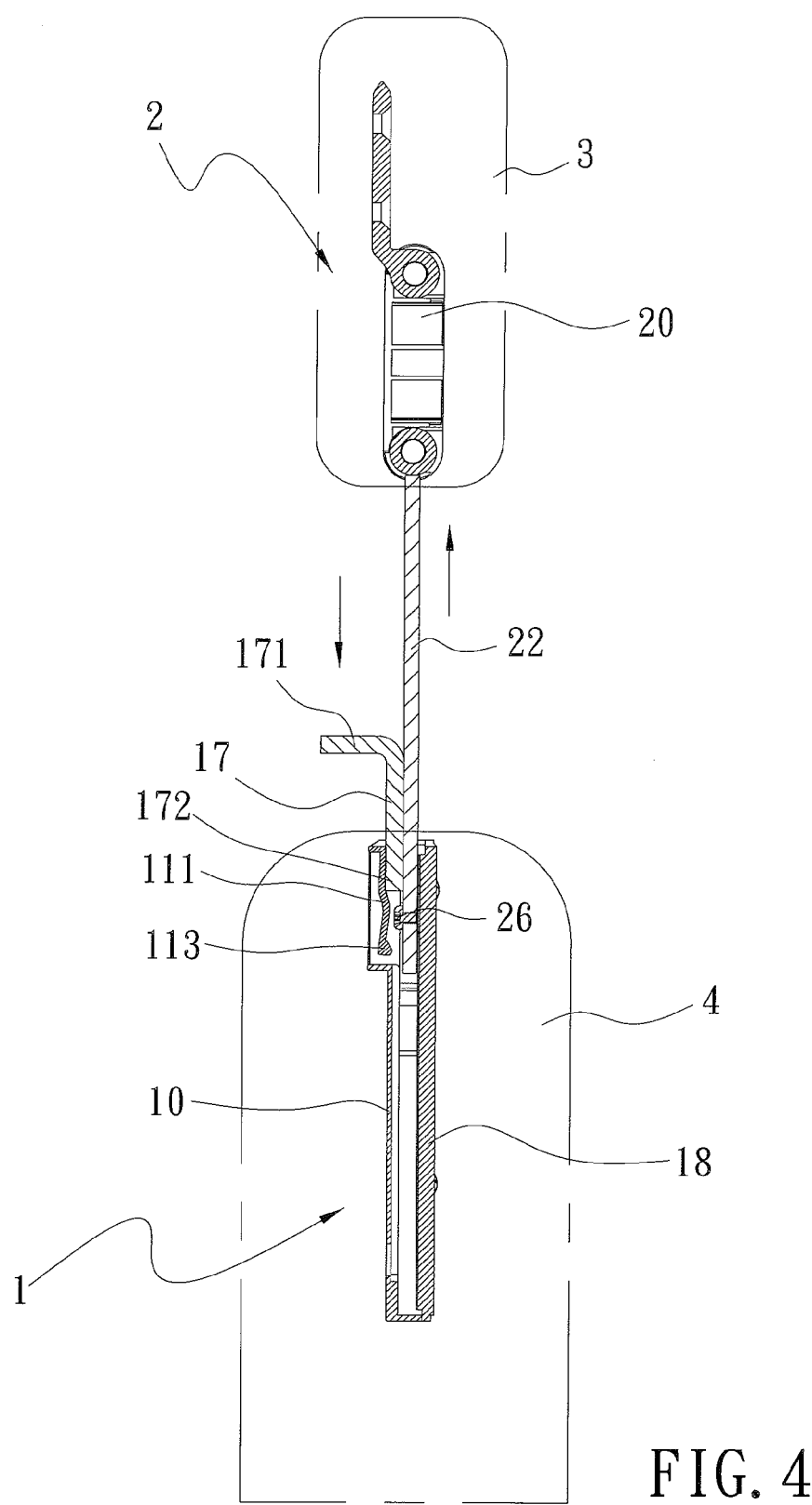
FIG. 4 is a cross sectional view showing the operation of the fixing unit and the vertical moving unit of the pillow support structure of the chair according to the preferred embodiment of the present invention.
Figure 5:
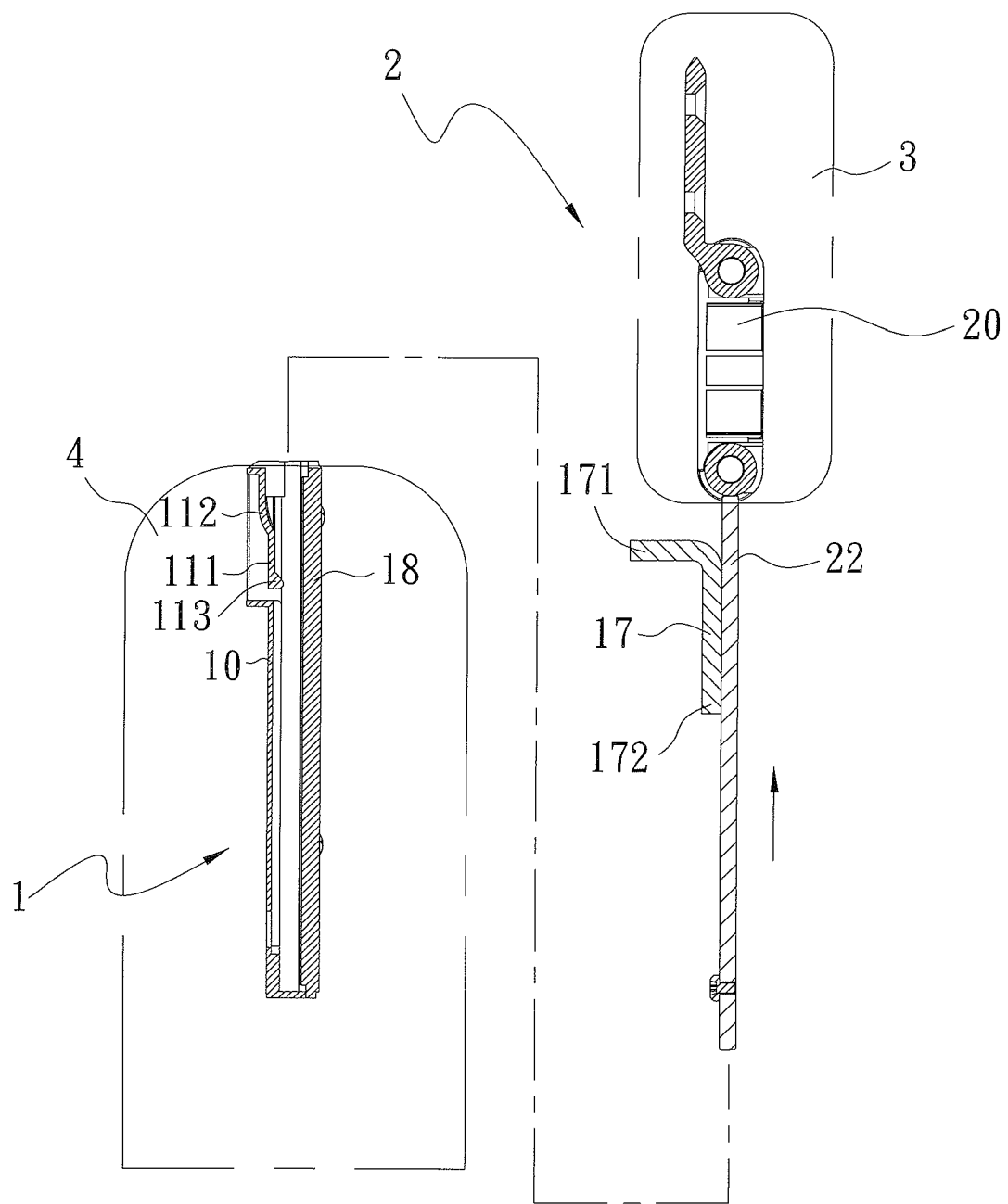
FIG. 5 is a cross sectional view showing the operation of the fixing unit and the vertical moving unit of the pillow support structure of the chair according to the preferred embodiment of the present invention.

In operation, as shown in FIG. 3, the vertical moving unit 2 is adjusted to move vertically relative to the fixing unit 1, wherein the moving member 20 is pulled, and the peripheral teeth 24 of the sliding panel 22 engages with the tooth portion 121 of the swinging rib 12 to adjust the sliding panel 22 and the body 10 in a multi-section positioning manner; when desiring to disengage the vertical moving unit 2 from the fixing unit 1, the pressing segment 171 of the inserting member 17 is pressed so that the limiting piece 111 of the body 10 is forced to swing the defining end 113 outward by means of the tilted guide recess 112 (as illustrated in FIGS. 4-5), hence the stop element 26 of the sliding panel 22 of the moving member 20 is capable of preventing from contacting with the defining end 113 of the body 10 so that the sliding panel 22 of the moving member 20 disengages from the body 10 of the fixing unit 1 smoothly.

Thereby, the vertical moving unit 2 of the pillow support 3 is capable of being adjusted to move upward and downward relative to the fixing unit 1 of the supporting plate 4 in a multi-section adjusting manner, and the vertical moving unit 2 of the pillow support 3 is removed from the fixing unit 1 quickly to be maintained easily.

While we have shown and described various embodiments in accordance with the present invention, it is clear to those skilled in the art that further embodiments may be made without departing from the scope of the present invention.

What is claimed is:

1. A pillow support structure of a chair comprising:

a fixing unit including a body and a back cover, wherein the body includes a longitudinal groove fixed therein, the longitudinal groove includes a laterally through slot secured adjacent to a top end thereof and having a limiting piece to swing resiliently connected with the through slot, and the limiting piece includes a tilted guide recess disposed on a top end thereof and a defining end formed on a bottom end thereof; the longitudinal groove includes a resilient swinging rib and an abutting tab fixed on two preset positions of two sides thereof individually, wherein the swinging rib includes a tooth portion;

a vertical moving unit including a moving member and a sliding panel coupled on a bottom end of the moving member, wherein the sliding panel is fixed in the longitudinal groove of the body and includes a stop element secured on a predetermined position thereof to be limited on a defining end of the body, wherein the sliding panel includes a plurality of peripheral teeth arranged on one side thereof and includes a side rim attached on another side thereof so that the peripheral teeth engage with the tooth portion of the body in a multi-section positioning manner, and the side rim is biased against the abutting tab of the body;

an inserting member including a biasing end disposed on a bottom end thereof and a pressing segment fixed on a top end thereof so that the inserting member is inserted into the tilted guide recess of the body, whereby with pressing segment pressed, limiting piece of the body is forced to swing the defining end outward by ways of the tilted guide recess, wherein the stop element of the sliding panel of the moving member is capable of preventing contact with the defining end of the body so that the sliding panel of the moving member disengages from the body smoothly.

2. The pillow support structure of the chair as claimed in claim 1, wherein the moving member of the vertical moving unit further includes a pillow support to cover the chair.

3. The pillow support structure of the chair as claimed in claim 1, wherein the fixing unit further includes a supporting plate to cover the chair.

4. The pillow support structure of the chair as claimed in claim 1, wherein the body includes a plurality of holes disposed at predetermined positions of an inner side thereof, and each hole includes inner threads formed therein, the back cover includes a number of orifices arranged thereon to correspond to the holes of the body respectively so that the back cover and the body are connected together by screwing a plurality of preset bolt elements with the holes and the orifices individually.

5. The pillow support structure of the chair as claimed in claim 1, wherein the stop element of the sliding panel is formed in a bolt shape and includes outer threads formed thereon, the sliding panel includes a screw aperture to correspond to the stop element so that the stop element is screwed with the screw aperture of the sliding panel.

* * * * *